Patented May 4, 1937

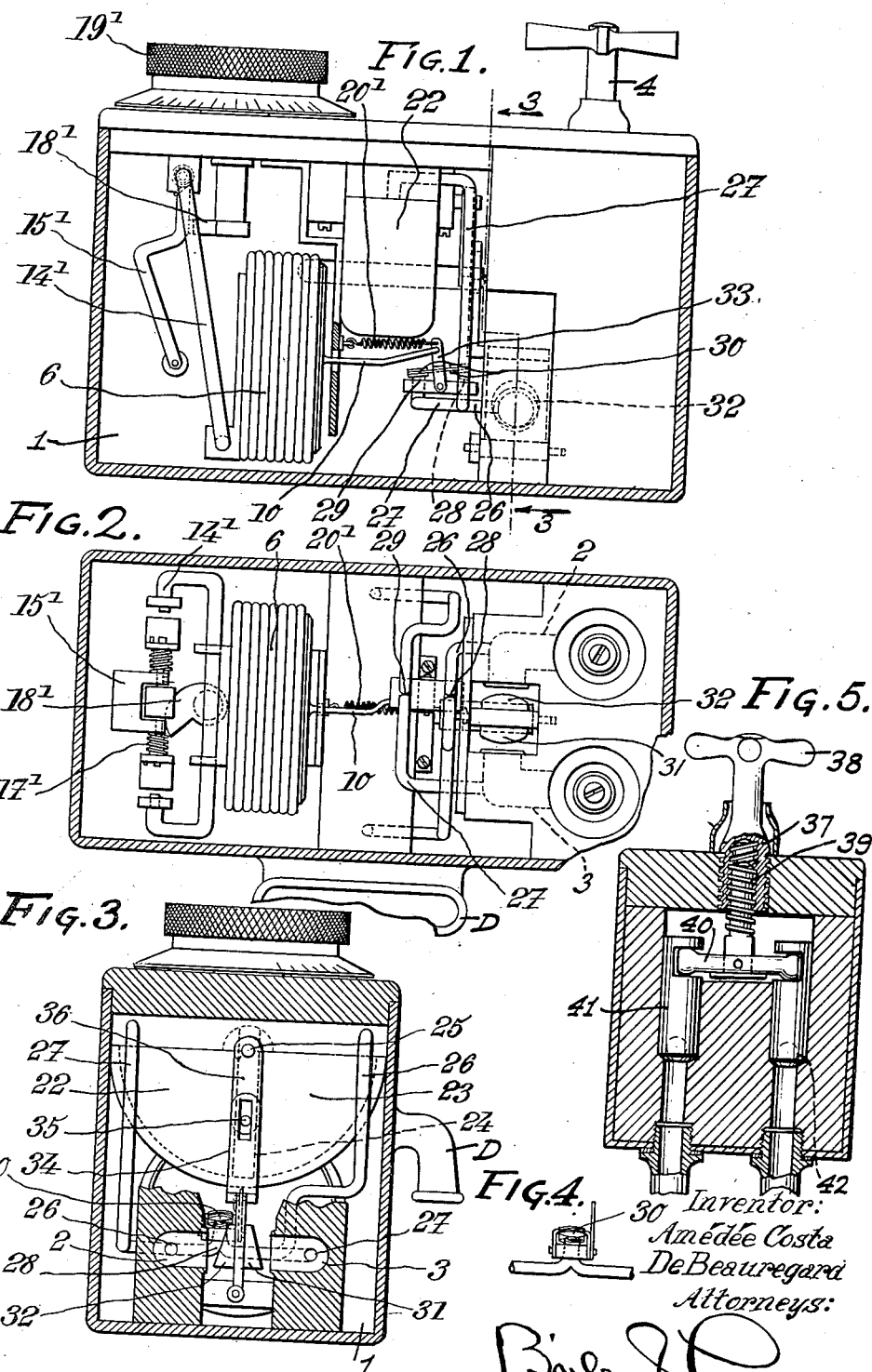

2,079,397

UNITED STATES PATENT OFFICE 2,079,397

APPARATUS FOR REGULATING THE TEMPERATURE OF FLUIDS

Amédée Costa de Beauregard, Paris, France

Application April 25, 1935, Serial No. 18,233
In Belgium February 23, 1935

11 Claims. (Cl. 236—12)

The present invention relates to apparatus for regulating the temperature of fluids and especially, although not exclusively, to apparatus for mixing hot water and cold water and controlling the temperature of the mixture thus formed.

The object of the present invention is to provide an apparatus of this type which is better adapted to meet the requirements of practice than apparatus of the same type made up to the present time.

The main feature of the present invention consists in providing apparatus of this kind with a thermostatic device adapted, when brought into play and for at least a portion of its zone of action, to simultaneously increase the rate of feed of one of the fluids to be mixed together and decrease the rate of feed of the other fluid.

Another feature of the invention consists in making use, as thermostatic device, of an element adapted to be moved in the direction of its deformations.

Still another feature of the invention consists in providing, between the member, operable manually or otherwise, through which the action of the thermostatic element is to be adjusted, and the means for controlling the rates of flow of the two fluids, a transmission, including said thermostatic device, provided with elastic means for permitting the necessary relative displacement of said controlling means and said manually operable member, when the adjustment of the apparatus is modified, during the time necessary for the thermostatic device to adapt itself to the new temperature to be obtained in the apparatus.

Still another feature of the present invention consists in combining with a thermostatic device fixed at one end to the frame of the apparatus a transmission of variable length connecting the other end of said thermostatic device with the means for controlling the rates of flow of the two fluids, so as to permit of adjusting the apparatus.

Still another feature of the present invention consists in connecting the thermostatic device with the control means of a servo-motor including at least one movable partition on the opposite faces of which the pressures of the fluids to be mixed together are caused to act by said control means, in such manner that the energy spent by the servo-motor for closing one fluid inlet is supplied, at least partly, by the pressure in the fluid conduit leading to said inlet.

Finally, still another feature of the present invention, which can be adapted to all apparatus provided with cocks, consists in providing said cock with a lift valve and means for imparting to said valve only translatory displacements, for instance by combining the actions of two opposed threadings.

Other features of the present invention will result from the following detailed description of some specific embodiments thereof.

Preferred embodiments of the present invention will be hereinafter described with reference to the accompanying drawing, given merely by way of example, and in which:

Figs. 1, 2 and 3 are an elevational view, a plan view, and a sectional view on the line 3—3 of Fig. 1, respectively, of one embodiment of the invention;

Fig. 4 is a detail view of a part of the apparatus of Fig. 1;

Fig. 5 is a sectional view of a device for mixing fluids made according to one of the features of the present invention.

In the following detailed description of some specific embodiments of the invention, it will be assumed, in order to simplify the description, that the apparatus is intended for mixing together hot water and cold water in suitable proportions for obtaining always a mixture at a given temperature.

The apparatus includes a casing forming a chamber 1, provided for instance with a lateral overflow D, and into which open a hot water inlet conduit 2 and a cold water inlet conduit 3, both controlled by a cock 4. According to the present invention, the apparatus includes a thermostatic device adapted, when brought into action and for at least a portion of its zone of action, to vary the rates of flow through said respective conduits simultaneously and inversely, that is to say to increase the rate of flow through one of said inlet conduits while correspondingly reducing the rate of flow through the other conduit. This thermostatic device 6 acts for instance on conjugated valve means mounted in said conduits respectively, for instance on two valves 31 and 32 mounted to control conduits 2 and 3 and arranged in such manner that the opening of one of these valves corresponds to the closing of the other one.

I may, as shown in Figs. 1 to 4, place a thermostatic element 6 between a rod 10 through which it acts on the hot and cold water valves and two small connecting rods 14[1] capable of pivoting about a spindle carried by the frame, through angles the amplitudes of which are limited by those of the displacements of the organ controlled by said rod 10.

An abutment plate 15[1] is then pivotally mounted on the frame, independently of the thermostatic element and its support, said plate carrying a roller adapted to cooperate with the rear face of the thermostatic element. The apparatus is provided with manually operable means for controlling the position of abutment 15', said manual means including a button or knob 19' keyed on the spindle of a cam 18' pivotally mounted in the frame of the apparatus. Plate 15' is applied against the periphery of this cam owing to the provision of a spring such as 20' to be described below.

I provide a spring $20^1$ urging thermostatic element 6 toward plate $15^1$, this spring being for instance connected at one end with the member actuated by the thermostatic element, and I further provide a spring $17^1$ urging plate $15^1$ against cam $18^1$. This last mentioned spring must be stronger than spring $20^1$, for instance twice as strong, and in any case sufficiently strong for keeping cam $18^1$ and plate $15^1$ in contact with each other when the thermostatic element bears against said plate so as to produce a displacement of the organ operatively connected with said thermostatic element.

The operation of this apparatus is substantially as follows: When the manual member or knob 19' is in the position marked "cold", the radius of the portion of the cam acting on plate 15' is minimum and spring 20' maintains the thermostatic element in the position corresponding to the opening of the cold water inlet conduit and the closing of the hot water inlet conduit.

When knob 19' is turned to the "hot" position, the rearward displacement imparted by the rotation of cam 18' to plate 15' is greater than the total stroke of the control member of the valves corresponding to the closing of the cold water inlet and to the opening of the hot water inlet. Therefore plate 15' is moved away from the rear face of thermostatic element 6.

In the position finally assumed by the parts, under the action of the inflow of hot water into chamber 1, thermostatic element 6 expands and springs 17', which are stronger than springs 20', urge said thermostatic element toward plate 15'. As soon as the rear face of thermostatic element 6 has been brought into contact with plate 15', a further expansion of element 6 causes the cold water inlet to be opened and finally a position of equilibrium corresponding to the desired temperature is obtained.

If knob 19' is turned in the direction of decreasing temperatures, the radius of the portion of the cam in contact with plate 15' will be reduced, and, owing to the provision of springs 20', the parts will be displaced in such manner as to increase the proportion of cold water admitted into casing 1.

It will be noted that, in the position of rest, the thermostatic element is not subjected to the action of the springs of the apparatus.

An apparatus as above described may be employed, for instance, for feeding water at a constant temperature to baths, heating systems; for the feed of cooling circulation systems for bearings; for the feed, at constant temperature, of congelation tanks or the like.

The advantages of this apparatus are the following:

(a) It ensures automatically, quickly and accurately, a uniform temperature of a fluid to be distributed;

(b) It does not subject the thermostatic element to important stresses;

(c) Its construction is both simple and strong.

This apparatus may be combined, according to the present invention, with the following arrangements, adapted to be employed also separately.

According to a first arrangement, a servo-motor is interposed between the thermostatic element and the means for controlling the rates of flows of the fluids to be mixed together.

Advantageously, according to my invention, this servo-motor includes a movable partition on the opposite faces of which I cause the respective pressures of the fluids to be mixed together to act, under the effect of a control system, in such manner that the energy spent by the servo-motor for closing one of the valves through which the inflow of fluids is controlled is supplied, at least partly, by the pressure of the fluid fed to said valve.

For instance, as shown in Figs. 1 to 4, the servo-motor includes a chamber, for instance of semi-circular shape, which is separated into two compartments of variable volume 22 and 23 by a partition 24 adapted to pivot about an axis 25.

Each of these chambers 22 and 23 is connected to one of the inlet conduits 2 and 3 respectively through pipes 26 and 27 provided with control means for varying the respective pressures exerted on the opposite faces of partition 24.

As for these control means they comprise two exhaust ejectors 28 and 29, connected with pipes 26 and 27 respectively, these pipes being arranged in such manner that the fluid from the feed conduits tends to flow through the ejectors, producing, when its velocity is sufficiently high, through an effect similar to that utilized in Giffard's injectors, a suction on the fluids filling chambers 22 and 23 which is transmitted to the opposite faces of partition 24.

It will be readily understood that, if there is provided, for controlling and adjusting the rates of flow through the two ejectors above mentioned, a combined valve 30, of the "balance" type for instance, it is possible by displacing this combined valve 30, on the one hand to reduce and even to stop the flow through one of the ejectors, which creates in the corresponding pipe and chamber a rise of pressure, and on the other hand to increase the rate of flow through the other ejector, which further reduces the suction in the corresponding pipe and chamber.

It follows that, as the pressures acting on the opposite faces of partition 24 do not any longer balance each other, said partition 24 is displaced.

An arrangement as above described constitutes a servo-motor which might be utilized in many different ways but which I combine with the mixing apparatus above described in such manner that the displacements of partition 24 serve to regulate the respective rates of flow of hot water and cold water.

The thermostatic element acts on combined valve 30 and partition 24 acts on valves 31 and 32 controlling the relative proportions of hot water and cold water admitted into chamber 1 in such manner that the closing of one of the inlet conduits by one of these valves 31 and 32 is produced by cutting off, at least partly, the flow of liquid through the ejector fed by said conduit.

For this purpose, rod 10, which is connected to the front end of thermostatic element 6, acts on a lever 33 operatively connected with valve 30 in such manner that expansion of thermostatic element 6 causes the flow of water through ejector 28 connected to hot water pipe 26 to be cut off.

Between partition 24 and valves 31 and 32 I provide cinematic connecting means adapted to multiply the force exerted by the servo-motor for applying these valves against their seats. For instance, as shown in the drawing, both of these valves are mounted on a common rod itself operatively connected to a lever 34 at the end of which is provided a lug 35 on which is adapted to act a lever 36 provided with a slide and mounted on spindle 25, which is driven by partition 24.

The automatic mixing apparatus thus obtained has, besides the advantages above stated, the following particular advantages:

(a) It causes one of the conduits to be closed all the more strongly as the obturation is more complete, that is to say as the pressure of the fluid in said conduit more opposes its obturation;

(b) It can work when the feed conduits are under different pressures;

(c) It is highly accurate because small elongations of the thermostatic element modify considerably the relative proportions of the fluids that are admitted;

(d) It does not require strong efforts of the thermostatic element, which controls the obturation of ejectors of relatively small section.

According to another characteristic of the present invention, shown by Fig. 5, instead of utilizing, for controlling the inflow of both fluids to the apparatus, valves such as 31 and 32, shown in Fig. 1, I make use of a cock of the kind including lift valves, said cock being actuated in such manner that the displacements of at least one lift valve are merely translatory, by combining the actions of right and left threads.

This cock consists of a cylindrical piece 37, which can be actuated manually through a handle 38 and which is provided, on the one hand with outer threads which permit it to move, under the effect of a rotation of the handle, with respect to the body of the apparatus, and on the other hand inner threads permitting, when piece 37 is rotated, to impart a translatory movement to a threaded part 39 which is connected, through any suitable cinematic device such for instance as a disc 40, with lift valves 41 and 42.

Such a cock, the operation of which results clearly from the above description thereof, has, over existing devices, in which the displacements of the valve are obtained through means causing it to rotate or through swivel means, the following advantages:

(a) the operation of said cock involves but very little wear and tear of the valve seats;

(b) it reduces very much water hammering due to the closing of the cock;

(c) it remains accurate when in use due to the fact that the causes of wear and tear are practically eliminated;

(d) it is very simple of construction.

Of course, the overflow might be connected in series with a distribution system of fluid under pressure without modifying the invention. The manual means might be replaced by electrically (or otherwise) operated control means and other adjusting means, responsive for variations of the atmospheric temperature, for instance, might be added to the apparatus.

The word "ejector" as used in the specification and claims is intended to indicate a device by which a flow of fluid in one pipe will produce a suction in a connecting pipe. Such a device consists essentially of a main pipe in which a fluid flows and a second pipe connected to the main pipe at an acute angle and pointing generally in the direction of the flow in the main pipe.

In a general way, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. In an apparatus including a casing, two inlet conduits for feeding fluids into said casing, an outlet passage in said casing for the outflow of the mixture of fluids formed therein, and valves for simultaneously varying the respective rates of flow of the fluids through said inlet conduits, a servo-motor which comprises, in combination, a closed box, a partition movable inside said box, dividing the inside of said box into two distinct chambers of variable volume, two pipes connecting said conduits with said chambers respectively, an ejector connected with each of said pipes operative by the fluid pressure in the corresponding conduit, for producing a suction in the corresponding chamber, means for simultaneously controlling said respective ejectors, and means for connecting said valves with said movable partition, whereby the displacements of said valves are controlled by said partition.

2. A device for mixing fluids of different respective temperatures and controlling the temperature of the mixture thus formed, which comprises, in combination, a casing, two inlet conduits for feeding fluids at different respective temperatures opening into said casing, an outlet passage in said casing for the outflow of the mixture formed therein, a system, including two valves, for simultaneously and inversely varying the respective rates of flow of the fluids through said inlet conduits, a closed box, a partition movable inside said box so as to divide the inside thereof into two distinct chambers of variable volume, two pipes connecting said inlet conduits with said chambers respectively, an ejector connected with each of said pipes, operative by the fluid pressure in the corresponding conduit, for producing a suction in the corresponding chamber, thermostatic means, responsive to variations of the temperature of the mixture of fluids formed in said casing, operative to simultaneously control said respective ejectors, and means, operative by said movable partition, for controlling said system, including two valves, for simultaneously and inversely varying the respective rates of flow of the fluids through said inlet conduits.

3. In an apparatus including a casing, two inlet conduits for feeding fluids into said casing, an outlet passage in said casing for the outflow of the mixture of fluids formed therein, and valves for varying the respective rates of flow of the fluids through said inlet conduits, a servo-motor which comprises, in combination, a box, a part movable in said box, and adapted to form at least one chamber of variable volume in said box, at least one ejector connected to at least one of said inlet conduits and operative by the fluid pressure in said conduit, a pipe connecting said ejector with said chamber, means for controlling said ejector, and means for connecting said valves with said movable part for controlling the valves.

4. A device for mixing fluids of different respective temperatures and controlling the temperature of the mixture thus formed, which comprises, in combination, a casing, two inlet conduits for feeding fluids at different respective temperatures opening into said casing, an outlet passage in said casing for the outflow of the mixture formed therein, a system including two valves, for simultaneously and inversely varying the respective rates of flow of the fluids through said inlet conduits, a box, a movable part in said box and adapted to form at least one chamber of variable volume in said box, at least one ejector connected to at least one of said inlet conduits and operative by the fluid pressure in said conduit, a pipe connecting said ejector with said chamber, thermostatic means responsive to variations of the temperature of the mixture of fluids formed in said casing, operative to control said ejector, and means operative by said movable part for controlling said system.

5. A device for mixing fluids of different respective temperatures and controlling the temperature of the mixture thus formed, which comprises, in combination, a casing, two inlet conduits for feeding fluids at different respective temperatures opening into said casing, an outlet passage in said casing for the outflow of the mixture formed therein, a valve system for varying the respective rates of flow of the fluids through said inlet conduits, a box, a movable part in said box and adapted to form at least one chamber of variable volume in said box, at least one ejector connected to at least one of said inlet conduits and operative by the fluid pressure in said conduit, a pipe connecting said ejector with said chamber, thermostatic means responsive to variations of the temperature of the mixture of fluids formed in said casing, operative to control said ejector, and means operative by said movable part for controlling said valve system.

6. A device for mixing fluids of different respective temperatures and controlling the temperature of the mixture thus formed, which comprises, in combination, a casing, two inlet conduits for feeding fluids at different respective temperatures opening into said casing, an outlet passage in said casing for the outflow of the mixture formed therein, control means for varying the respective rates of flow through said inlet conduits, a thermostatic element, deformable parallelly to a given direction in response to variaations of the temperature of the mixture of fluids in said casing, movably carried in said casing parallelly to said direction, an abutment for one end of said thermostatic element movable in said casing, means for operatively connecting said control means with the other end of said thermostatic element, and adjusting means for moving said abutment in said casing in accordance with the desired temperature to be obtained in said casing, said adjusting means including a knob pivotally carried by said casing on the outside thereof, a cam coaxial with said knob and rigid therewith mounted in said casing in operative engagement with said abutment, and elastic means for urging said abutment against said cam, said cam being adapted upon turning of said knob to move said abutment away from the thermostat against the action of said elastic means.

7. A device for mixing fluids of different respective temperatures and controlling the temperature of the mixture thus formed, which comprises, in combination, a casing, two inlet conduits for feeding fluids at different respective temperatures opening into said casing, an outlet passage in said casing for the outflow of the mixture formed therein, control means for varying the respective rates of flow through said inlet conduits, a thermostatic element, deformable in response to variations of the temperature of the mixture of fluids in said casing, movably carried in said casing, an abutment for a first end of said thermostatic element, said abutment being movable in said casing, elastic means for urging said abutment towards said first end, means for operatively connecting said control means with a second end of said thermostatic element, and adjusting means for moving said abutment against the action of said elastic means, in accordance with the desired temperature to be obtained in said casing, said adjusting means including a control element movably carried by the casing on the outside thereof.

8. A device according to claim 7 wherein the control means comprise a valve system and a servo-motor, having a pilot element and a power element, adapted to act on the valve system for varying the respective rates of flow of the fluids through said inlet conduits, the second end of the thermostatic element being operatively connected to said pilot element.

9. A device for mixing fluids of different respective temperatures and controlling the temperature of the mixture thus formed, which comprises, in combination a casing, two inlet conduits for feeding fluids at different respective temperatures opening into said casing, an outlet passage in said casing for the outflow of the mixture formed therein, a valve system for varying the respective rates of flow of the fluids through said inlet conduits, a box, a movable part in said box adapted to form at least one chamber of variable volume in said box, means operatively connecting said movable part to said valve system to control the same, at least one ejector connected to at least one of said inlet conduits and operative by the fluid pressure in said conduit, a pipe connecting said ejector with said chamber, a thermostatic element, deformable in response to variations in the temperature of the mixture of fluids in said casing, movably carried in said casing, an abutment for a first end of said thermostatic element, said abutment being movable in said casing, elastic means for urging said abutment towards said first end, control means for said ejector, means for operatively connecting said control means with a second end of said thermostatic element, and adjusting means for moving said abutment against the action of said elastic means in accordance with the desired temperature to be obtained in said casing, said adjusting means including a control element movably carried by the casing on the outside thereof.

10. An apparatus for mixing together two fluids at different temperatures so as to produce a mixture at a predetermined temperature, which comprises, in combination, a casing forming a mixing chamber, two inlet conduits for supplying the respective fluids at different temperatures to said chamber, means for controlling the flow of the fluids from said conduits, respectively, into said chamber, a servo-motor including a structure forming a chamber of variable volume having a movable wall operatively connected with said fluid inlet control means and an ejector, operative by fluid under pressure, connected with said last mentioned chamber so as to exert a suction therein when in operation, and thermostatic means, responsive to variations of temperature of the fluid mixture formed in the apparatus, for controlling the outlet of said ejector.

11. An apparatus for mixing together two fluids at different temperatures so as automatically to produce a mixture at a predetermined temperature, which comprises, in combination, a casing forming a mixing chamber, two inlet conduits for supplying the respective fluids at different temperatures to said chamber, means for controlling the inflow of said fluids from said conduits, respectively, to said chamber, a servo-motor including a structure of variable volume having a movable wall operatively connected with said fluid inlet control means and an ejector, operative by fluid under pressure, connected with said last mentioned chamber so as to exert a suction therein when in operation, means for controlling the outlet of said ejector, a thermostatic element, responsive to variations of temperature of the fluid mixture formed in the apparatus, connected at one end to the last mentioned means and an adjustable stop carried by said casing adapted to cooperate with the other end of said thermostatic element.

AMÉDÉE COSTA DE BEAUREGARD.